United States Patent
Sakata et al.

(10) Patent No.: US 10,949,320 B2
(45) Date of Patent: Mar. 16, 2021

(54) DEVICE, PROGRAM AND RECORDING MEDIUM FOR ESTIMATING A NUMBER OF BROWSING TIMES OF WEB PAGES

(71) Applicant: SYMMETRIC CO., LTD., Tokyo (JP)

(72) Inventors: Kazutoshi Sakata, Tokyo (JP); Jun Nakanishi, Tokyo (JP); Naomasa Fushimi, Tokyo (JP)

(73) Assignee: Symmetric Co., Ltd., Tokyo (JP)

( * ) Notice: Subject to any disclaimer, the term of this patent is extended or adjusted under 35 U.S.C. 154(b) by 187 days.

(21) Appl. No.: 16/326,742

(22) PCT Filed: Aug. 26, 2016

(86) PCT No.: PCT/JP2016/074990
§ 371 (c)(1),
(2) Date: May 28, 2019

(87) PCT Pub. No.: WO2018/037559
PCT Pub. Date: Mar. 1, 2018

(65) Prior Publication Data
US 2020/0387437 A1    Dec. 10, 2020

(51) Int. Cl.
*G06F 16/95* (2019.01)
*G06F 11/34* (2006.01)
*H04L 29/08* (2006.01)
*G06F 11/30* (2006.01)

(52) U.S. Cl.
CPC ........ *G06F 11/3438* (2013.01); *G06F 11/302* (2013.01); *H04L 67/22* (2013.01); *G06F 16/95* (2019.01)

(58) Field of Classification Search
None
See application file for complete search history.

(56) References Cited

U.S. PATENT DOCUMENTS

| | | | |
|---|---|---|---|
| 7,346,703 B2* | 3/2008 | Cope | G06F 11/3438 709/238 |
| 2005/0223093 A1* | 10/2005 | Hanson | H04L 67/22 709/224 |
| 2006/0282795 A1* | 12/2006 | Clark | H04L 61/3015 715/840 |
| 2008/0243835 A1* | 10/2008 | Suzuki | G06F 16/951 |

(Continued)

FOREIGN PATENT DOCUMENTS

JP    11328226 A    11/1999

*Primary Examiner* — James A Edwards
(74) *Attorney, Agent, or Firm* — MKG, LLC

(57) ABSTRACT

A means for estimating a number of browsings of each web page in a Web site which is consistent with an actual number of browsings includes an acquisition unit of estimation that acquires data indicating a number of landings, a number of browsings, and a number of moving visitors for each move-destination in a past predetermined period, for each of the plural web pages included in the Web site, from an access analysis server device. Data is acquired indicating an assumed number of landings input by a user. An estimated value of the number of browsings of each web page is calculated by using these data when visitors of the assumed number of landings move from outside the Web site to each web page. A display a screen indicates the estimated value of the number of browsings calculated.

4 Claims, 6 Drawing Sheets

(56) References Cited

U.S. PATENT DOCUMENTS

2012/0324101 A1* 12/2012 Pecjack ................. H04L 67/02
  709/224
2014/0304337 A1* 10/2014 Michaeli ............... G06F 16/954
  709/204

* cited by examiner

| URI | GROUP NAME | ACTUAL NUMBER OF BROWSINGS (O) | ACTUAL NUMBER OF LANDINGS (L) | MOVEMENT INFORMATION | |
|---|---|---|---|---|---|
| | | | | DESTINATION | ACTUAL NUMBER OF MOVING VISITORS (M) |
| http://www.xxx01.html | 1. SITE OF XX COMPANY | 283 | 80 | http://www.xxx02.html | 11 |
| | | | | ... | ... |
| | | | | OTHER | 2 |
| ... | ... | ... | ... | ... | ... |
| OTHER | - | 50 | 15 | http://www.xxx01.html | 0 |
| | | | | ... | ... |
| | | | | OTHER | 0 |

| URI | ASSUMED NUMBER OF LANDINGS (E) | NUMBER OF INFLOWING VISITORS (F) | | | | ESTIMATED NUMBER OF BROWSINGS (P) | DIFFERENCE (D) |
|---|---|---|---|---|---|---|---|
| | | [1st] | [2nd] | ... | [NTH TIMES] | | |
| http://www.xxx01.html | 80 | 300.2 | 39.9 | ... | 0.0 | 445.2 | 162.2 |
| ... | ... | ... | ... | ... | ... | ... | ... |
| OTHER | 15 | 29.7 | 8.2 | ... | 0.0 | 56.4 | -15.6 |
| TOTAL VALUE (Q) | - | 3060.0 | 918.4 | ... | 0.2 | - | - |

DEVICE, PROGRAM AND RECORDING MEDIUM FOR ESTIMATING A NUMBER OF BROWSING TIMES OF WEB PAGES

TECHNICAL FIELD

The present invention relates to a technique for estimating a number of browsings of web pages.

BACKGROUND

Techniques have been proposed to estimate a number of times each of a plurality of web pages belonging to a web site is browsed. For example, JPH11-328226A proposes a system that calculates a predicted value of a number of visit-times (a number of access) by visitors to each of plural web pages included in a Web site. The calculation is made based on an assumption that a visitor to the Web site moves at a predetermined rate from one web page to another web page in the Web site, and that a number of web pages viewed by each visitor to the Web site follows a predetermined probability distribution.

The system described in JPH11-328226A set out above predicts a number of times that each web page is browsed based on an assumption that a visitor to the Website will browse the web pages in the Website in a number that accords with the predetermined probability distribution. However, this assumption may not necessarily apply to all Websites. Accordingly, there is a risk that a number of times that a web page is browsed as predicted by the system described in JPH11-328226A will substantially deviate from an actual number of times that the web page is browsed.

In view of the above circumstances, it is an object of the present invention to provide a means for estimating a number of times that each web page in a Website is browsed in a manner that is consistent with an actual number of times that the Website page is actually browsed.

SUMMARY OF THE INVENTION

In order to solve the above-mentioned problem, the present invention provides an apparatus comprising an acquisition unit that acquires browsing frequency data, moving visitors data, and assumed landing data, the browsing frequency data indicating a number of times that a web page was browsed by a visitor of a Web site in a past predetermined period for each of a plurality of web pages included in the Web site, the moving visitors data indicating, for each of the plurality of the web pages, a number of visitors who moved from the web page they were browsing to another web page included in the Web site for each move-destination web page in the predetermined period, and the assumed landing data indicating, for each of the plurality of the web pages, a number of visitors assumed to move from the outside of the Web site to the web page, a first calculation unit that repeatedly executes a series of calculations until the calculated inflowing visitors satisfies a predetermined condition, the series of calculations including inflowing calculation, the inflowing calculation including, calculating a number of outflowing visitors of each web page by multiplying a specified number of inflowing visitors with a ratio of a value indicated by the moving visitors data to a value indicated by the browsing frequency data, and calculating a number of new inflowing visitors of each web page by summing up the calculated outflowing visitors for each of the destination web pages, wherein an initial value of the specified number of inflowing visitors being a number of visitors indicated by the assumed landing data, the specified number of inflowing visitors being a number of the new inflowing visitors calculated previously in the repeated calculation, and a second calculation unit that calculates an estimated number of browsings of each of the plurality of the web pages based on the specified number of inflowing visitors used in each of the calculation processings repeatedly executed by the first calculation unit.

In the apparatus described above, there may be adopted a configuration that comprises a third calculation unit for calculation of a difference between the estimated number of browsings calculated by the second calculation unit and a number of browsings indicated by the browsing frequency data for each of the plurality of the web pages.

The present invention also provides a computer program that causes a computer to execute a process, the process comprising acquiring browsing frequency data indicating a number of times that a web page was browsed by a visitor of a Web site in a past predetermined period for each of a plurality of web pages included in the Web site, acquiring moving visitors data that indicates, for each of the plurality of the web pages, a number of visitors who moved from the web page they were browsing to another web page included in the Web site relative to each of a move-destination in the predetermined period, acquiring assumed landing data indicating, for each of the plurality of the web pages, a number of visitors assumed to move from the outside of the Web site to the web page, executing a series of calculations repeatedly until the calculated inflowing visitors satisfies a predetermined condition, the series of calculations including inflowing calculation, the inflowing calculation including, calculating a number of outflowing visitors of each web page by multiplying a specified number of inflowing visitors with a ratio of a value indicated by the moving visitors data to a value indicated by the browsing frequency data, and calculating a number of new inflowing visitors of each web page by summing up the calculated outflowing visitors for each of the destination web pages, wherein an initial value of the specified number of inflowing visitors is a number of visitors indicated by the assumed landing data, the specified number of inflowing visitors is a number of the new inflowing visitors calculated previously in the repeated calculation, and calculating an estimated number of browsings of each of the plurality of the web pages based on the specified number of inflowing visitors used in each of the executed repeat processing calculations.

The present invention also provides a non-transitory computer-readable recording medium for storing a computer program that causes a computer to execute a process, the process comprising acquiring browsing frequency data indicating a number of times that a web page was browsed by a visitor of a Web site in a past predetermined period for each of a plurality of web pages included in the Web site, acquiring moving visitors data indicating, for each of the plurality of the web pages, a number of visitors who moved from the web page to another web page included in the Web site for each move-destination web page in the predetermined period, acquiring assumed landing data indicating, for each of the plurality of the web pages, a number of visitors assumed to move from the outside of the Web site to the web page, executing a series of calculations repeatedly until the calculated inflowing visitors satisfies a predetermined condition, the series of calculations including inflowing calculation, the inflowing calculation including, calculating a number of outflowing visitors of each web page by multiplying a specified number of inflowing visitors with a ratio of a value indicated by the moving visitors data to a value indicated by the browsing frequency data, and calculating a number of new inflowing visitors of each web page by summing up the calculated outflowing visitors for each of the destination web pages, wherein an initial value of the specified number of inflowing visitors is a number of visitors indicated by the assumed landing data, and the specified number of inflowing visitors is a number of the new inflowing visitors calculated previously in the repeated calculation, and calculating an estimated number of browsings of each of the plurality of the web pages based on the specified number of inflowing visitors used in each of the calculation processings executed repeatedly.

In the present invention, a number of times that a web page is browsed when the assumed number of visitors moves from outside to the Web site is estimated based on a number of times that each web page is browsed within a past predetermined period, and on a number of visitors who move to each of a move destination relative to each web page within the predetermined period. Accordingly, the number of times that each web page is browsed is in the present invention presumed to be consistent with the number of times each web page is browsed within the past predetermined period.

BRIEF DESCRIPTION OF THE DRAWINGS

FIG. 5 illustrates an exemplary configuration of a second table stored by the estimation device according to one embodiment.

FIG. 6 illustrates an exemplary screen displayed by a display according to an instruction of the estimation device according to one embodiment.

DETAILED DESCRIPTION

Figure 1:
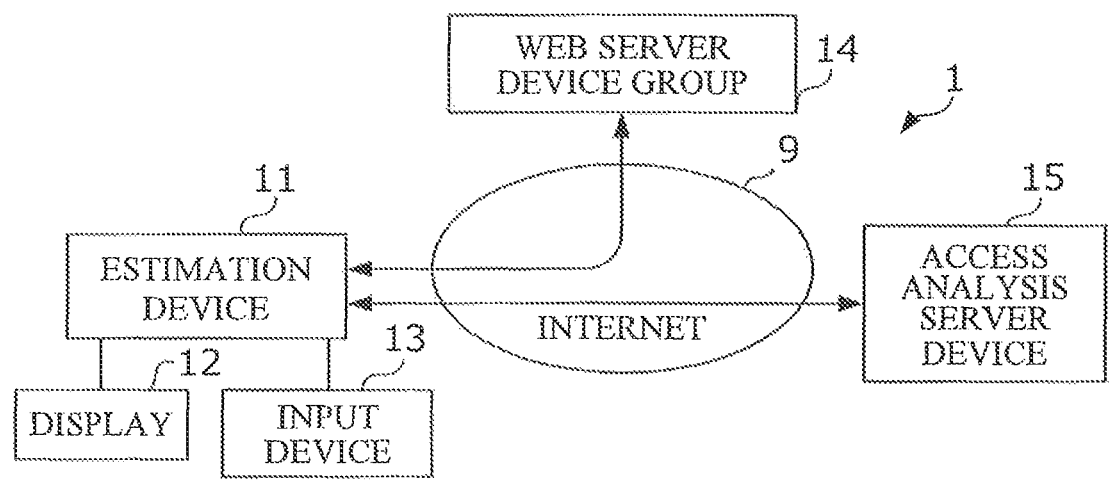
FIG. 1 illustrates a configuration of a system including an estimation device according to one embodiment.

Estimation device 11 according to one embodiment of the present invention will be described below. FIG. 1 illustrates a configuration of system 1 including estimation device 11. System 1 includes estimation device 11, display 12, input device 13, Web server device group 14, and access analysis server device 15. Display 12 and input device 13 are connected to estimation device 11. Estimation device 11 performs data communication with Web server group 14 and access analysis server device 15 via Internet 9.

Web server device group 14 is a group of known Web server devices that transmits various data required for displaying a web page to a requesting Web browser, in response to a request from the Web browser.

Access analysis server device 15 is a known access analysis server device that analyzes accesses to a Web site registered by a user and transmits data indicating access analysis results to a terminal device or the like of the user. It is to be noted that information indicated by the data provided by access analysis server device 15 includes, for example, a number of times that the entire Web site has been browsed in the past predetermined period, a number of times that each web page in the Web site is browsed, an outflow rate from each web page in the Web site, search keywords used by visitors to visit the Web site, movement route between web pages of visitors to the Web site, a ratio (a conversion rate) of visitors who performed a predetermined operation on a predetermined web page of the Web site, and the like.

Estimation device 11 extracts or generates, and uses, the following three items of data from the various data provided by access analysis server device 15.

(1) data indicating, for each of the plural web pages included in the Web site managed by a user (administrator of the Web site), an actual number of times in a predetermined period in the past that a web page is browsed (hereinafter referred to as "actual number of browsings") (hereinafter referred to as "browsing frequency data").

(2) for each of the plurality of the web pages included in the Web site managed by the user, data indicating a number of visitors who actually moved to other web pages in the same Web site or outside the Web site during a past predetermined period for each determination (hereinafter referred to as "a number of moving visitors") (hereinafter referred to as "moving visitors data").

(3) for each of the plurality of web pages included in the Web site managed by the user, data indicating a number of visitors who actually moved from the outside of the Web site to the web page during a past predetermined period (hereinafter referred to as "measured number of landings") (hereinafter referred to as "data of a measured number of landings").

Estimation device 11 is a device for presenting an estimated number of times that each web page has been browsed (hereinafter referred to as "estimated number of browsings") to a user in a case where an assumed number of visitors visit the Web site when the user inputs the number of visitors assumed to have moved from the outside of the Web site to the web pages (hereinafter referred to as "assumed number of landings") with respect to the web pages in the Web site.

Figure 2:
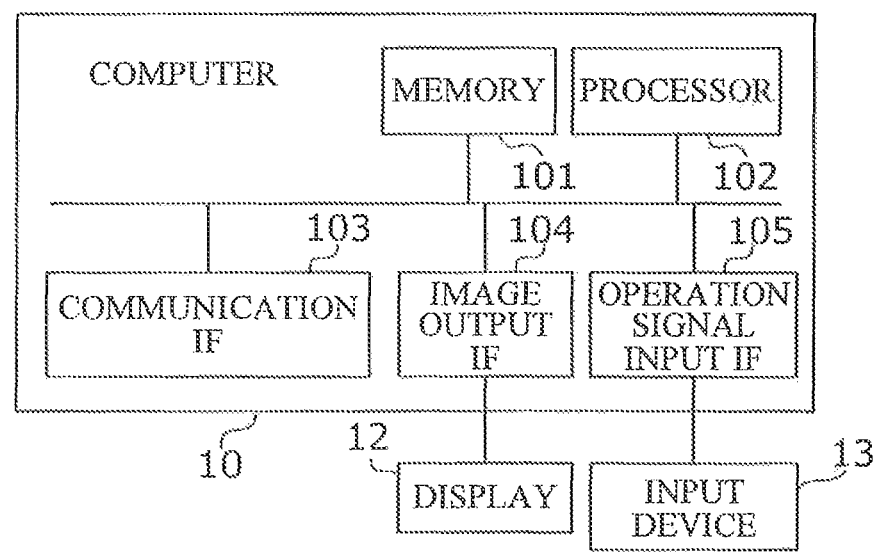
FIG. 2 illustrates a configuration of a computer used for implementing the estimation device according to one embodiment.

Estimation device 11 is implemented in a general computer executing data processing according to a program. FIG. 2 illustrates a configuration of computer 10 used to implement estimation device 11 together with display 12 and input device 13 connected to computer 10.

Display 12 is, for example, a liquid crystal display, and displays an image represented by data output from computer 10. Input device 13 is, for example, a keyboard and a mouse. Input device 13 receives an operation of a user, and outputs an operation signal indicating the content of the operation to computer 10. It is to be noted that a part or the whole of display 12 and input device 13 may be configured as a single device integrated with computer 10.

Computer 10 includes memory 101 that stores various data, processor 102 that performs various data processing according to a program stored in memory 101, communication IF 103 that is an interface for sending and receiving various data to and from an external device under control of processor 102, image output IF 104 that outputs data representing an image to display 12, and operation signal input IF 105 that is an interface for receiving an input of an operation signal from input device 13.

Figures 3, 4:
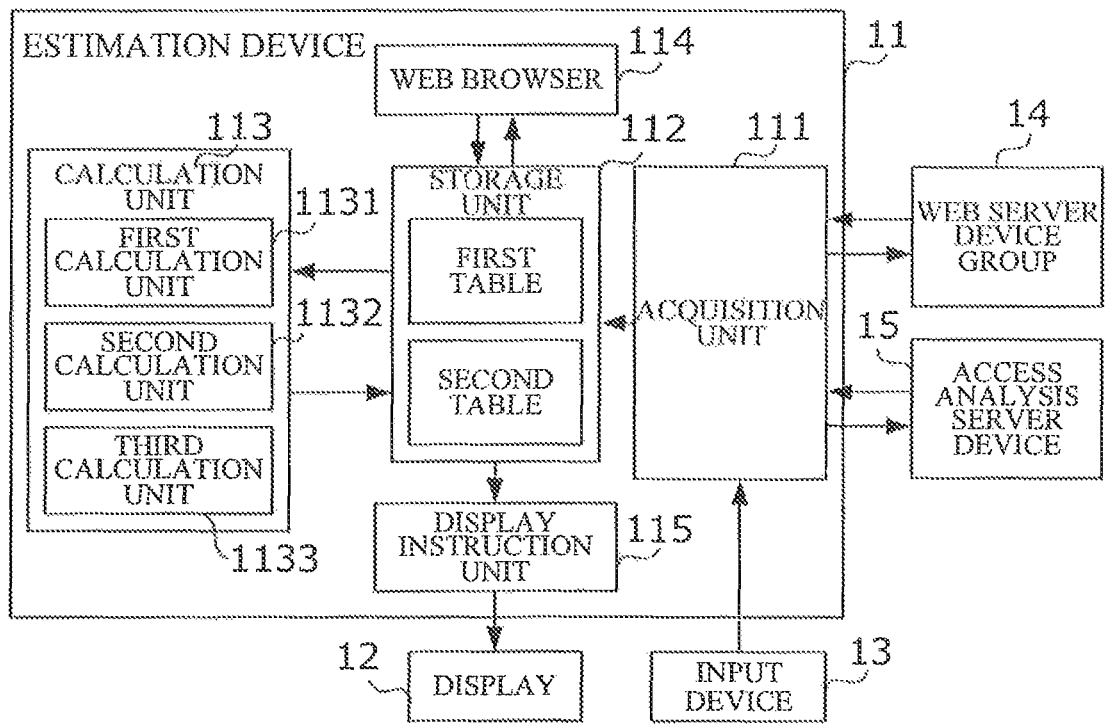
FIG. 3 illustrates a functional configuration of the estimation device according to one embodiment.
FIG. 4 illustrates an exemplary configuration of a first table stored by the estimation device according to one embodiment.

FIG. 3 illustrates a functional configuration of estimation device 11. That is, as processor 102 performs data processing according to a program for estimation device 11, computer 10 operates as estimation device 11 having the functional elements shown in FIG. 3.

Estimation device 11 includes acquisition unit 111, storage unit 112, calculating unit 113, Web browser 114, and display instruction unit 115.

Acquisition unit 111 acquires various data. Specifically, acquisition unit 111 acquires data indicating an analysis result on access to the Web site in a past predetermined period from access analysis server device 15. The past predetermined period is, for example, a period of the most recent predetermined length of time (for example, one week) in which the analysis by access analysis server device 15 is completed at the time when acquisition unit 111 acquires data from access analysis server device 15.

Acquisition unit 111 acquires data from access analysis server device 15, for example, in accordance with an instruction input by the user using input device 13. It is to be noted that acquisition unit 111 may acquire data from access analysis server device 15, for example, periodically (for example, every one week) without waiting for an instruction from a user.

The data acquired by acquisition unit 111 from access analysis server device 15 is stored in storage unit 112. Acquisition unit 111 extracts or generates browsing frequency data, moving visitors data, and data of a measured number of landings from the data received from access analysis server device 15.

Further, acquisition unit 111 acquires data indicating an assumed number of landings input by a user (hereinafter referred to as "assumed landing data") from input device 13.

Further, acquisition unit 111 acquires from Web server device group 14 data that Web browser 114 uses for generating a web page according to a URI specified by a user.

Storage unit 112 stores various data. Storage unit 112 stores a first table for storing the browsing frequency data, and the like, and a second table for storing the assumed landing data, and the like. The first table and the second table are used in the process performed by estimation device 11, described later.

FIG. 4 illustrates an exemplary configuration of the first table. The first table is a collection of data records relevant to each of the web pages. The first table includes data fields [URI], [group name], [actual number of browsings (O)], [actual number of landings (L)], and [movement information].

The data field [URI] usually stores a URI of a web page included in the Web site managed by a user. The URI stored in the data field [URI], is, for example, a URI input by a user to estimation device 11 using input device 13. However, data indicating "other" is stored in the data field [URI] of a last data record included in the first table instead of a URI of a web page. "Other" means a collection of web pages having no data record corresponding to the first table among the web pages included in the Web site managed by a user.

In the data field [group name], a group name of a group to which the web page belongs is stored. The group names stored in the data field [group name] is, for example, a group name input by a user to estimation device 11 using input device 13. The user usually groups the web pages by assigning the same group name to a web page whose content is relevant.

In the data field [actual number of browsings (O)], browsing frequency data extracted or generated from the data acquired by acquisition unit 111 from access analysis server device 15 is stored. In the data field [actual number of landings (L)], data of a measured number of landings extracted or generated from the data acquired by acquisition unit 111 from access analysis server device 15 is stored.

In the data field [movement information], moving visitors data extracted or generated from the data acquired by acquisition unit 111 from access analysis server device 15 is stored. The data field [movement information] includes a sub data field [destination] and [actual number of moving visitors (M)]. In the sub data field [destination], data indicating a destination of a visitor who browsed the web page corresponding to the data record is stored. In the sub data field [destination], a URI of another web page in the Web site or "other" is stored. "Other" is the same as "other" stored in the data field [URI].

In the sub data field [actual number of moving visitors (M)], a number of visitors who moved from the web page corresponding to the data record to another web page in the Web site (a number of moving visitors) in the past predetermined period is stored. A value of the sub data field [actual number of moving visitors (M)] does not include a number of visitors who moved to the outside of the Web site (a number of departed visitors). Therefore, in each data record of the first table, a sum of values of the sub data field [actual number of moving visitors (M)] is smaller than a value of the data field [actual number of browsings (O)] by the number of departed visitors.

It is to be noted that, regarding data included in the data acquired from access analysis server device 15 among data to be stored in the first table, acquisition unit 111 extracts the data and stores them in corresponding data fields of the first table. On the other hand, regarding data not included in the data acquired from access analysis server device 15 among data to be stored in the first table, acquisition unit 111 generates the data by using the data acquired from access analysis server device 15.

For example, there may be cases where the data acquired from access analysis server device 15 includes data indicating an actual number of browsings of the whole Web site and an actual number of browsings of each web page registered in the first table in some cases, and does not include data indicating an actual number of browsings of a web page group of "other". In this case, acquisition unit 111 subtracts a sum of the actual number of browsings of each web page registered in the first table from the actual number of browsings of the entire Web site, thereby calculating an actual number of browsings of the web page group of "other".

Further, for example, there may be cases where the data acquired from access analysis server device 15 includes data indicating an actual number of browsings of each web page registered in the first table, a number of moving visitors between the web pages registered in the first table and exit rate of each web page registered in the first table, and does not include data indicating a number of moving visitors from each web page registered in the first table to the web page group of "other". In this case, acquisition unit 111 multiplies the actual number of browsings by the withdrawal rate for each web page registered in the first table, thereby calculating a number of visitors who moved from the web page to the outside of the Web site (a number of departed visitors). Subsequently, with respect to each web page registered in the first table, acquisition unit 111 calculates a sum of the numbers of visitors moving from the web page to each of the other web pages registered in the first table. Subsequently, with respect to each web page registered in the first table, acquisition unit 111 subtracts the number of departed visitors and the sum of the numbers of moving visitors to each of the other web pages from the actual number of browsings of the web page, thereby calculating a number of moving visitors to the web page group of "other" from the web page.

As described above, acquisition unit 111 performs necessary calculations according to contents of data acquired from access analysis server device 15 and generates data to be stored in the first table.

FIG. 5 illustrates an exemplary configuration of the second table. The second table is a collection of data records relevant to each of the web pages. The second table includes data fields [URI], [assumed number of landings (E)], [number of inflowing visitors (F)], [estimated number of browsings (P)], and [difference (D)].

In the data field [URI] of the second table, a URI of a web page included in the Web site managed by the user, "other" and "total value (Q)" are stored. "Other" is the same as "other" stored in the data field [URI] of the first table. "Total value (Q)" means a sum of the numbers of inflowing visitors calculated for each of web pages corresponding to other data records in the second table.

In the data field [assumed number of landings (E)], the assumed landing data acquired from input device 13 by acquisition unit 111 is stored. The data field [number of inflowing visitors(F)] includes sub data fields [1st] to [nth times]. Here, "n" is a natural number indicating a number of repetitions of calculation processing of a number of inflowing visitors performed in process of estimation device 11 described later. "n", that is, a number of repeat times of the calculation processing of a number of inflowing visitors varies depending on the data stored in the first table and the data stored in the data field [assumed number of landings (E)].

In the data field [estimated number of browsings (P)], a sum of values stored in the data fields [assumed number of landings (E)] and [number of inflowing visitors (F)] is stored. In the data field [difference (D)], a value indicating a difference between a value stored in the data field [estimated number of browsings (P)] and a value stored in the data field [actual number of browsings (O)] of a corresponding data record in the first table is stored. It is to be noted that corresponding data records of the first table and the second table means data records in which the same data is stored in the data field [URI].

With reference to FIG. 3, description of the configuration of estimation device 11 will be continued. Calculation unit 113 performs various calculations. Calculation unit 113 includes first calculation unit 1131, second calculation unit 1132, and third calculation unit 1133. First calculation unit 1131 calculates, for each of the plurality of web pages, a number of inflowing visitors, which is a number of visitors moving to the web page from other web pages. Second calculation unit 1132 calculates an estimated number of browsings for each of the plurality of web pages based on the number of the inflowing visitors calculated by first calculation unit 1131. Third calculation unit 1133 calculates a difference between the estimated number of browsings calculated by second calculation unit 1132 for each of the plurality of web pages and the actual number of browsings indicated by the browsing frequency data. Details of the processing performed by calculation unit 113 will be described together in the description of operation of estimation device 11 to be described later.

Web browser 114 is a known Web browser that receives various data from Web server device group 14 according to a URI specified by a user and draws a web page using various data received from Web server device group 14.

Display instruction unit 115 generates screen data representing a screen for a user to input an assumed number of landings (hereinafter referred to as "setting screen of an assumed number of landings"), and a screen for displaying to the user an estimated number of browsings and the like calculated by calculation unit 113 (hereinafter referred to as "calculation result display screen"). Display instruction unit 115 instructs display 12 to display according to the generated screen data. The above is the description of the configuration of estimation device 11.

Next, operation of estimation device 11 will be described. When a user performs a predetermined operation on estimation device 11 using input device 13 with the latest data acquired by acquisition unit 111 from access analysis server device 15 being stored in the first table, display instruction unit 115 instructs display 12 to display the setting screen of an assumed number of landings. In response to this instruction, calculation unit 113 overwrites data of all the data fields excluding the data field [URI] of the second table with "0". Subsequently, display instruction unit 115 generates screen data representing the setting screen of an assumed number of landings and delivers the generated screen data to display 12. Display 12 displays the setting screen of an assumed number of landings according to the screen data delivered from display instruction unit 115.

Figure 6:
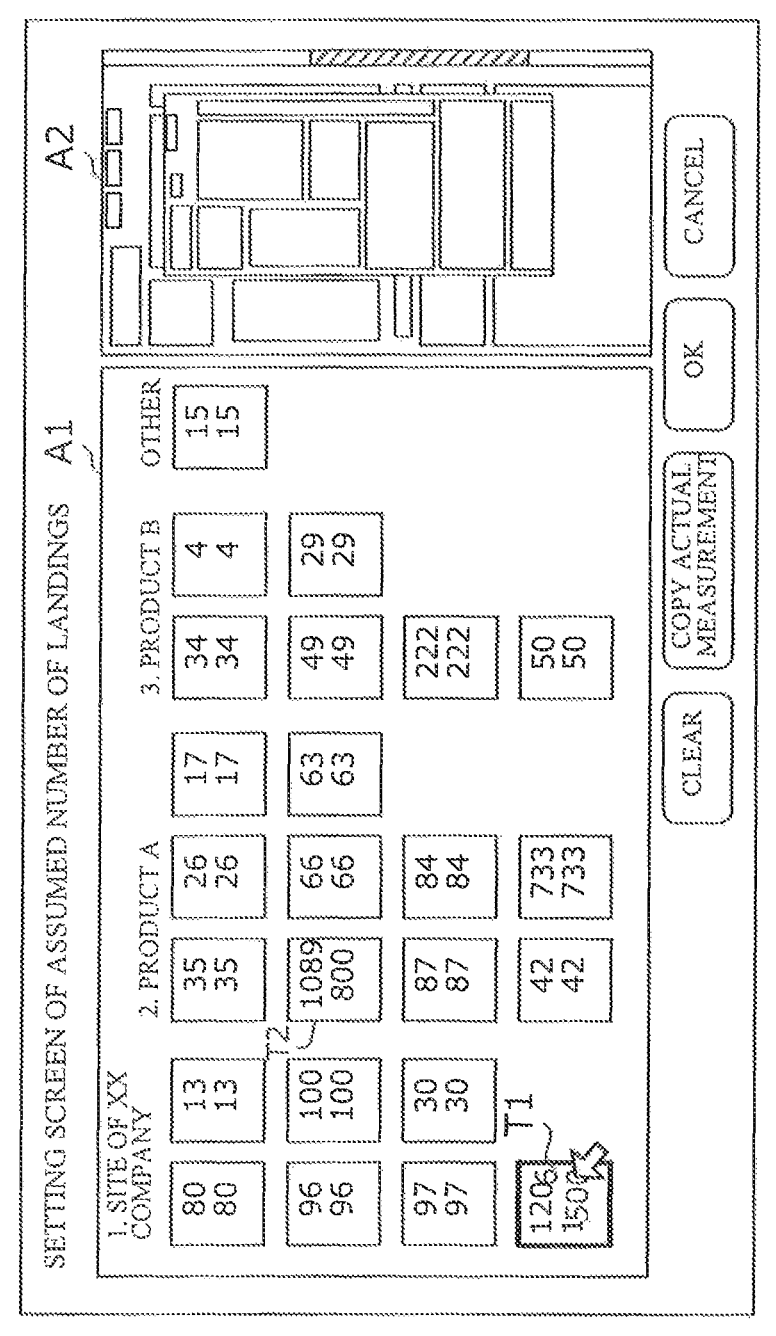

FIG. 6 illustrates an exemplary setting screen of an assumed number of landings. The setting screen of an assumed number of landings includes display area A1 and display area A2. In Display area A1, rectangular images (hereinafter referred to as "tile images") corresponding to URIs (or "other") stored in the data fields [URI] of the first table are arranged in a matrix form for each group indicated by the group name stored in the data field [group name]. A URI of a corresponding web page is associated with a tile image.

In display area A2, a web page corresponding to a tile image clicked by a user is displayed. When a user clicks on any of the tile images, a URI associated with the clicked tile image is delivered to Web browser 114. In accordance with the delivered URI, Web browser 114 acquires data from Web server device group 14 via acquisition unit 111 and draws a web page using the acquired data. Display instruction unit 115 generates screen data representing setting screen of the assumed number of landings including the web page drawn by Web browser 114 and delivers the screen data to display 12. As a result, display 12 displays the setting screen of an assumed number of landings including the web page in display area A2.

By clicking on a tile image, a user can confirm content of a web page corresponding to the tile image.

On the setting screen of an assumed number of landings, two values are displayed on each of the tile images. The value displayed in the upper row of the tile image indicates an actual number of landings of a corresponding web page. The value displayed in the lower row indicates an assumed number of landings of a corresponding web page. The actual number of landings displayed in the upper row of the tile image is a numerical value indicated by the data stored in the data field [actual number of landings (L)] of the first table. In the lower row of the tile image, the same value as the actual number of landings of the upper row is displayed as an initial value of the assumed number of landings.

A user can change the assumed number of landings displayed in the lower row of all the tile images to "0" by clicking the "clear" button displayed on the setting screen of an assumed number of landings. Further, the user can change the assumed number of landings displayed in the lower row of all the tile images to the same value as the actual number of landings displayed in the upper row by clicking the "copy actual measurement" button displayed on the setting screen of an assumed number of landings.

The user appropriately edits the assumed number of landings displayed at the bottom of the tile image. FIG. 6 exemplifies a state in which the assumed number of landings of tile images T1 and T2 are changed by the user, in a state in which the same values as the actual number of landings displayed in the upper row are displayed as the assumed number of landings in the lower row of all the tile images. Data indicating the assumed number of landings input by the user on the setting screen of an assumed number of landings is stored in the data field [assumed number of landings (E)] of the second table.

Figure 7:
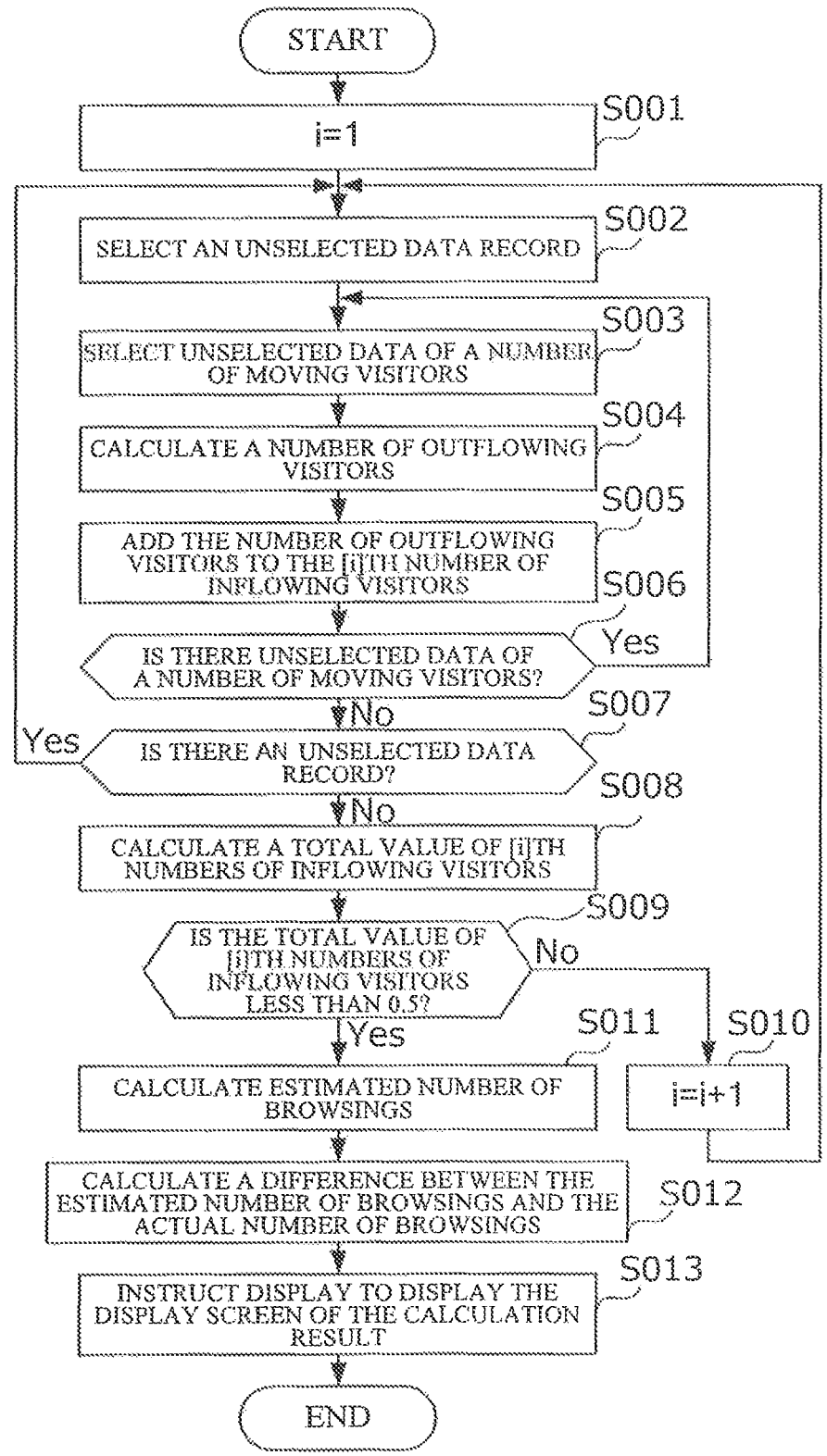
FIG. 7 illustrates an exemplary flow of processing performed by the estimation device according to one embodiment.

When inputting the assumed number of landings is completed, the user clicks the "OK" button displayed on the setting screen of an assumed number of landings. In response to this operation, estimation device 11 executes processing according to the flow shown in FIG. 7.

First, first calculation unit 1131 substitutes an initial value "1" into Counter i (step S001). Subsequently, first calculation unit 1131 selects one unselected data record from data records of the first table (step S002).

Subsequently, first calculation unit 1131 selects one unselected moving visitors data from the plurality of pieces of moving visitors data stored in the data field [movement information] of the data record selected in step S002 (step S003).

Subsequently, first calculation unit 1131 calculates a number of outflowing visitors "f" according to the following 4ression 1 (step S004).

$$f = F_{(i-1)} \times (M/O) \quad \text{(Expression 1)}$$

In this regard, in a case of Counter i=1, $F_{(i-1)}$ in Expression 1 is a value indicated by data stored in the data field [assumed number of landings (E)] of a data record of the second table corresponding to the data record of the first table selected at step S002. Further, in a case of Counter i≤2, $F_{(i-1)}$ in Expression 1 is a value indicated by data stored in the sub data field [(i−1) times] (where "i" is the value of Counter i) of the data field [number of inflowing visitors (F)] of the second table corresponding to the data record of the first table selected in step S002. "M" in Expression 1 is a value indicated by the moving visitors data selected in step S003 (a value indicated by data stored in the sub data field [actual number of moving visitors (M)]). "O" in Expression 1 is a value indicated by data stored in the data field [actual number of browsings (O)] of the data record selected in step S002.

Subsequently, first calculation unit 1131 adds the number of outflowing visitors "f" calculated in step S004 to the value stored in the sub data field [i th time](where "i" is the value of Counter i) of the data field [number of inflowing visitors (F)] of a data record of the second table corresponding to the data record of the first table selected in Step S002 (Step S005).

Subsequently, first calculation unit 1131 determines whether there is moving visitors data not selected in Step S003 among moving visitors data stored in the data field [movement information] of the data record selected in Step S002 (Step S006).

When there is unselected moving visitors data (Step S006; Yes), first calculation unit 1131 returns the process to Step S003, selects one unselected moving visitors data (Step S003), and repeats the processing of Steps S004 through S006 using the selected moving visitors data.

When there is no unselected moving visitors data (Step S006; NO), first calculation unit 1131 determines whether there is a data record not selected in Step S002 in the data records of the first table (Step S007).

When there is an unselected data record (Step S007; Yes), first calculation unit 1131 returns the process to Step S002, selects one unselected data record (Step S002), and repeats the processing of Steps S003 through S007 using the selected data record.

When there is no unselected data record (Step S007; No), first calculation unit 1131 calculates a sum of values stored in the sub data fields [i th times] (where "i" is the value of Counter i) of the data fields [number of inflowing visitors (F)] of all the data records in the second table (Step S008). Third calculation unit 1133 stores the value calculated in Step S008 in the sub data field [i th times] (where "i" is the value of Counter i) of the data field [number of inflowing visitors (F)] of the last data record in the second table, that is, the data record in which "total value (Q)" is stored in the data field [URI].

Subsequently, first calculation unit 1131 determines whether the total value calculated in Step S008 is less than "0.5" which is a predetermined threshold value (Step S009). When the total value calculated in Step S008 is equal to or greater than the threshold value "0.5" (Step S009; No), first calculation unit 1131 adds "1" to Counter i (Step S010) and thereafter returns the process to Step S002. After that, first calculation unit 1131 repeats the processing of Steps S002 to S009. The processing of Steps S002 to S009 repeatedly executed by first calculation unit 1131 is hereinafter referred to as "calculation processing of a number of inflowing visitors."

When the total value calculated in Step S008 is less than the threshold value "0.5" (Step S009; Yes), second calculation unit 1132 calculates, for each of the data records in the second table, an estimated number of browsings "P" according to the following Expression 2 (Step S011).

$$P = E + \Sigma F \quad \text{(Expression 2)}$$

In this regard, "E" in Expression 2 is a value indicated by data stored in the data field [assumed number of landings (E)]. "ΣF" in Expression 2 is a sum of values stored in the sub data fields [1st]–[i th times] (where "i" is the value of Counter i) of the data field [number of inflowing visitors (F)].

Second calculation unit 1132 stores the value calculated in Step S011 in the data field [estimated number of browsings (P)].

Subsequently, third calculation unit 1133 calculates a difference "D" between the estimated number of browsings and the actual number of browsings per each of the data records of the second table according to following Expression 3 (Step S012).

$$D = P - O \quad \text{(Expression 3)}$$

In this regard, "P" in Expression 3 is a value indicated by data stored in the data field [Estimated number of browsings (P)]. "O" in Expression 3 is a value stored in the data field [actual number of browsings (O)] of a corresponding data record in the first table.

Third calculation unit 1133 stores the value calculated in Step S012 in the data field [difference (D)].

Subsequently, display instruction unit 115 generates screen data representing a display screen of the calculation result by using the data stored in the first table and the second table, and delivers the generated screen data to display 12 (Step S013). Display 12 displays the display screen of the calculation result according to the screen data delivered from display instruction unit 115.

Figure 8:
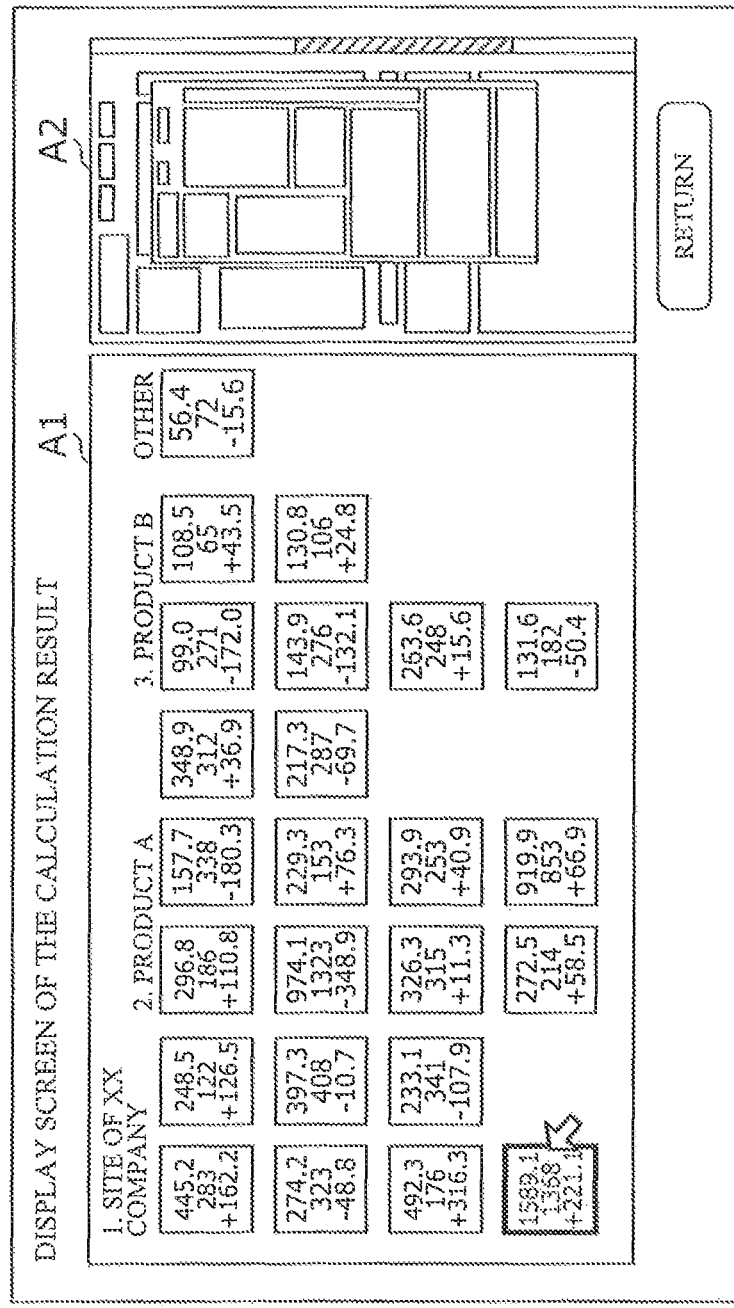
FIG. 8 illustrates an exemplary screen displayed by a display according to an instruction of the estimation device according to one embodiment.

FIG. 8 illustrates an exemplary display screen of the calculation result displayed by display 12 according to an instruction of display instruction unit 115 in Step S103. The display screen of the calculation result includes display area A1 in which tile images are displayed and display area A2 in which a web page corresponding to a tile image clicked by a user is displayed, similarly to the setting screen of an assumed number of landings. However, three numerical values are displayed on each tile image on the display screen of the calculation result.

On the display screen of the calculation result, a numerical value shown in the upper part of a tile image is the estimated number of browsings of a web page corresponding to the tile image. That is, the numerical value shown in the upper part of a tile image is a value of data stored in the data field [estimated number of browsings (P)] of a data record of the second table in which a URI associated with the tile image is stored in the data field [URI].

It is to be noted that a value of data stored in the data field [estimated number of browsings (P)] of a data record in the second table is an estimate of a number of times each web page is browsed by visitors when the visitors of the assumed number of landings set on the setting screen of an assumed number of landings move from the outside of the Web site to each web page in a future period. The future period has the same time length as the past predetermined period in which the number of browsings indicated by the data of actual number of browsings stored in the first table is measured.

Further, in the display screen of the calculation result, a numerical value shown in the middle part of a tile image is an actual number of browsings of a web page corresponding to the tile image. That is, the numerical value shown in the middle row of a tile image is a value of data stored in the data field [actual number of browsings (O)] of a data record of the first table in which a URI associated with the tile image is stored in the data field [URI].

Further, on the display screen of the calculation result, a numerical value shown in the lower row of a tile image is the difference between the estimated number of browsings and the actual number of browsings of a web page corresponding to the tile image. That is, the numerical value shown in the lower row of the tile image is a value of data stored in the data field [difference (D)] of a data record of the second table in which a URI associated with the tile image is stored in the data field [URI].

According to estimation device 11 described above, in a case where a user such as an administrator of the Web site takes external measures such as making click advertisements to guide visitors to a specific landing page in the Web site or internal measures such as changing content of a specific web page, the user can know the degree of influence of the measures on a number of browsings of each web page by inputting a number of landings to each web page which increase or decrease.

Furthermore, according to estimation device 11 described above, by inputting one or more number (for example, 100 or 1000) as the assumed number of landings of a web page of interest in the Web site and inputting 0 as the assumed number of landings of all web pages other than the web page of interest, a user such as an administrator of the Web site can know the distribution of a number of visitors moving from the web page of interest to other web page.

Modifications

The embodiments described above can be modified in various ways within the scope of the technical ideas of the present invention. Examples of such modifications are indicated below. Here, the following two or more modifications may be combined.

(1) In the embodiment described above, first calculation unit 1131 repeats the calculation processing of a number of inflowing visitors until a predetermined condition is satisfied that of a sum of the numbers of inflowing visitors calculated for each of the plurality of web pages in a single calculation processing of a number of inflowing visitors being less than a predetermined threshold value (Step S009; Yes). Various conditions regarding the number of outflowing visitors "f" calculated by first calculation unit 1131 in Step S004 may be adopted as the predetermined condition that should be satisfied for first calculation unit 1131 to finish the repetition of the calculation processing of a number of inflowing visitors.

For example, a configuration in which first calculation unit 1131 repeats the calculation processing of a number of inflowing visitors until a predetermined condition is satisfied that of a maximum value of the numbers of outflowing visitors "f" calculated in Step S004 that is repeatedly executed in one calculation processing of a number of inflowing visitors being less than a predetermined threshold value may be adopted.

(2) In the embodiment described above, estimation device 11 is implemented in a computer executing process according to programs. In place thereof, estimation device 11 may be configured as a so-called dedicated device.

(3) A program for causing a computer to execute processes to be performed by estimation device 11 may be distributed in a form of being continuously recorded on a computer-readable recording medium. In this case, the computer operates as estimation device 11 by reading the program from the recording medium and performing the processing according to the read program. These programs may be stored in a server device, transmitted from the server device to a computer via a network, and used in the computer.

EXPLANATION OF THE REFERENCE NUMERALS

1 . . . system
9 . . . Internet
10 . . . computer
11 . . . estimation device
12 . . . display
13 . . . input device
14 . . . web server device group
15 . . . access analysis server device
101 . . . memory
102 . . . processor
103 . . . communication IF
104 . . . image output IF
105 . . . operation signal input IF
111 . . . acquisition unit
112 . . . storage unit
113 . . . calculation unit
114 . . . Web browser
115 . . . display instruction unit
1131 . . . first calculation unit
1132 . . . second calculation unit
1133 . . . third calculation unit

What is claimed is:

1. An apparatus comprising:
an acquisition unit that acquires browsing frequency data, moving visitors data, and assumed landing data, the browsing frequency data indicating a number of times that a web page was browsed by a visitor of a Web site in a past predetermined period for each of a plurality of web pages included in the Web site, the moving visitors data indicating, for each of the plurality of the web pages, a number of visitors who moved from the web page they were browsing to another web page included in the Web site for each move-destination web page in the predetermined period, and the assumed landing data indicating, for each of the plurality of the web pages, a number of visitors assumed to move from the outside of the Web site to the web page;

a first calculation unit that executes a series of calculations repeatedly until the calculated inflowing visitors satisfies a predetermined condition, the series of calculations including inflowing calculation, the inflowing calculation including,
  calculating a number of outflowing visitors of each web page by multiplying a specified number of inflowing visitors with a ratio of a value indicated by the moving visitors data to a value indicated by the browsing frequency data, and
  calculating a number of new inflowing visitors of each web page by summing up the calculated outflowing visitors for each of the destination web pages; wherein
  an initial value of the specified number of inflowing visitors being a number of visitors indicated by the assumed landing data, the specified number of inflowing visitors being a number of the new inflowing visitors calculated previously in the repeated calculation; and a second calculation unit that calculates an estimated number of browsings of each of the plurality of the web pages based on the specified number of inflowing visitors used in each of the calculation processings repeatedly executed by the first calculation unit.

2. The apparatus of claim 1, further comprising:
a third calculation unit that calculates a difference between the estimated number of browsings calculated by the second calculation unit and a number of browsings indicated by the browsing frequency data for each of the plurality of the web pages.

3. A process for estimating a number of browsings of a webpage, the process comprising:
  acquiring browsing frequency data indicating a number of times that a web page was browsed by a visitor of a Web site in a past predetermined period for each of a plurality of web pages included in the Web site;
  acquiring moving visitors data indicating, for each of the plurality of the web pages, a number of visitors who moved from the web page they were browsing to another web page included in the Web site for each move-destination web page in the predetermined period;
  acquiring assumed landing data indicating, for each of the plurality of the web pages, a number of visitors assumed to move from the outside of the Web site to the web page;
  executing a series of calculations repeatedly until the calculated inflowing visitors satisfies a predetermined condition, the series of calculations including inflowing calculation, the inflowing calculation including,
    calculating a number of outflowing visitors of each web page by multiplying a specified number of inflowing visitors with a ratio of a value indicated by the moving visitors data to a value indicated by the browsing frequency data, and
    calculating a number of new inflowing visitors of each web page by summing up the calculated outflowing visitors for each of the destination web pages; wherein
    an initial value of the specified number of inflowing visitors being a number of visitors indicated by the assumed landing data, the specified number of inflowing visitors being a number of the new inflowing visitors calculated previously in the repeated calculation; and
  calculating an estimated number of browsings of each of the plurality of the web pages based on the specified number of inflowing visitors used in each of the calculation processings repeatedly executed.

4. A computer-readable non-transitory recording medium storing a computer program that causes a computer to execute a process, the process comprising:
  acquiring browsing frequency data indicating a number of times that a web page was browsed by a visitor of a Web site in a past predetermined period for each of a plurality of web pages included in the Web site;
  acquiring moving visitors data indicating, for each of the plurality of the web pages, a number of visitors who moved from the web page they were browsing to another web page included in the Web site for each move-destination web page in the predetermined period;
  acquiring assumed landing data indicating, for each of the plurality of the web pages, a number of visitors assumed to move from the outside of the Web site to the web page;
  executing a series of calculations repeatedly until the calculated inflowing visitors satisfies a predetermined condition, the series of calculations including inflowing calculation, the inflowing calculation including,
    calculating a number of outflowing visitors of each web page by multiplying a specified number of inflowing visitors with a ratio of a value indicated by the moving visitors data to a value indicated by the browsing frequency data, and
    calculating a number of new inflowing visitors of each web page by summing up the calculated outflowing visitors for each of the destination web pages, wherein
    an initial value of the specified number of inflowing visitors being a number of visitors indicated by the assumed landing data, the specified number of inflowing visitors being a number of the new inflowing visitors calculated previously in the repeated calculation; and
  calculating an estimated number of browsings of each of the plurality of the web pages based on the specified number of inflowing visitors used in each of the calculation processings, repeatedly executed.

* * * * *